United States Patent
Rajput

(10) Patent No.: US 11,924,656 B2
(45) Date of Patent: Mar. 5, 2024

(54) AUTOMATIC RF TRANSMIT POWER CONTROL FOR OVER THE AIR TESTING

(71) Applicant: Fitbit LLC, San Francisco, CA (US)

(72) Inventor: Sidd Rajput, Temecula, CA (US)

(73) Assignee: FITBIT LLC, San Francisco, CA (US)

( * ) Notice: Subject to any disclaimer, the term of this patent is extended or adjusted under 35 U.S.C. 154(b) by 234 days.

(21) Appl. No.: 17/379,317

(22) Filed: Jul. 19, 2021

(65) Prior Publication Data
US 2023/0021166 A1    Jan. 19, 2023

(51) Int. Cl.
*H04W 24/06* (2009.01)
*G06F 1/16* (2006.01)
*H04B 17/21* (2015.01)
*H04W 52/52* (2009.01)

(52) U.S. Cl.
CPC ............ *H04W 24/06* (2013.01); *G06F 1/163* (2013.01); *H04B 17/21* (2015.01); *H04W 52/52* (2013.01)

(58) Field of Classification Search
CPC ...... H04W 24/06; H04W 52/52; H04B 17/13; H04B 17/21; G06F 1/163
See application file for complete search history.

(56) References Cited

U.S. PATENT DOCUMENTS

| | | | |
|---|---|---|---|
| 8,195,105 B1 | 6/2012 | Erickson | |
| 8,417,198 B1 | 4/2013 | Lipshitz et al. | |
| 8,571,497 B1 | 10/2013 | Lin et al. | |
| 8,712,339 B2 | 4/2014 | Steele et al. | |
| 9,966,918 B2 | 5/2018 | Petrovic | |
| 10,009,848 B2 | 6/2018 | Lin et al. | |
| 2008/0311864 A1 | 12/2008 | Wallis | |
| 2009/0197547 A1* | 8/2009 | Wang | H04B 17/21 455/127.1 |
| 2012/0142290 A1* | 6/2012 | Kim | H04B 17/101 455/115.1 |
| 2013/0057252 A1* | 3/2013 | Kang | H04B 17/101 324/76.12 |

(Continued)

OTHER PUBLICATIONS

International Search Report and Written Opinion for Application No. PCT/US2022/037429, dated Oct. 25, 2022, 12 pages.

(Continued)

*Primary Examiner* — Oussama Roudani
(74) *Attorney, Agent, or Firm* — Dority & Manning, P.A.

(57) ABSTRACT

A computer-implemented method for setting RF transmit power of a wireless device includes obtaining power response data for a power detector of the wireless device, the power response data providing a relationship between power detector readings from the power detector and measured transmit power of a transmitter of the wireless device; identifying a target power detector reading value corresponding to a target transmit power based at least in part on the power response data; initializing a transmitter gain of the transmitter to an initial transmitter gain value; obtaining a power detector reading value from the power detector; determining that a difference between the power detector reading value and the target power detector reading value is greater than a tolerance margin; and adjusting a transmitter gain value of the transmitter in a direction of the difference between the power detector reading value and the target power detector reading value.

18 Claims, 5 Drawing Sheets

(56) References Cited

U.S. PATENT DOCUMENTS

| | | | | |
|---|---|---|---|---|
| 2013/0235954 A1* | 9/2013 | Rozenblit | ............. | H04W 52/12 |
| | | | | 375/345 |
| 2014/0055198 A1* | 2/2014 | Su | ........................ | H03G 3/3042 |
| | | | | 330/129 |
| 2014/0057684 A1* | 2/2014 | Khlat | ....................... | H03F 3/505 |
| | | | | 455/574 |
| 2017/0141802 A1* | 5/2017 | Solomko | .............. | H04B 1/0458 |
| 2018/0092048 A1* | 3/2018 | Cheng | .................... | H04B 17/13 |
| 2021/0314017 A1* | 10/2021 | Yang | ........................ | H04B 1/44 |

OTHER PUBLICATIONS

Maximintegrated.com, "Techniques for measuring RF gain using the MAX2016", Maxim Integrated, https://www.maximintegrated.com/en/design/technical-documents/app-notes/3/3629.html, retrieved Dec. 8, 2021, 8 pages.

Machine Translated Chinese Search Report Corresponding to Application No. 202111300196.2 dated Nov. 14, 2023.

* cited by examiner

400

410

420

| Tx Power (dBm) | Power Detector Reading Value for Given Transmit Power (HDET Value) |
|---|---|
| 6.8 | 701 |
| | 764 |
| | 832 |
| | 923 |
| | 1057 |
| | 1214 |
| | 1423 |
| 18 | 1674 |
| 19.6 | 1969 |
| 21.2 | 2333 |
| 22.8 | 2799 |
| 24.4 | 3408 |
| 26 | 3926 |
| 27.6 | 4095 |
| 29.2 | 4095 |
| 30.8 | 4095 |

The 10th and the 11th Index Bound the Target Transmit Power of the 23 dBm

The HDET Values at the 10th and 11th Indexes

FIG. 4

AUTOMATIC RF TRANSMIT POWER CONTROL FOR OVER THE AIR TESTING

FIELD

The present disclosure relates generally to wearable devices. More particularly, the present disclosure relates to automatic RF transmit power control for over the air testing of wearable devices.

BACKGROUND

Manufacturing a wireless-enabled device can include calibrating the device's maximum transmit power to a specified limit, such as a regulatory limit. For instance, among even devices manufactured according to the same specifications, device-to-device variations in manufacturing conditions, suppliers, component tolerances, and/or other factors can contribute to performance variations in, among other things, the maximum transmit power of the devices. Calibration can thus be required to ensure near-identical maximum transmit power among manufactured devices. For instance, having consistent and reliably-calibrated transmit power across manufactured devices can provide for improved performance of the devices, adherence of devices to regulatory guidelines, etc. The maximum transmit power can be calibrated during an over-the-air (OTA) testing stage of manufacturing. For instance, various characteristics (e.g., gain(s)) of the device can be adjusted and/or configured such that the device achieves the specified maximum transmit power.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for setting RF transmit power of a wireless device. The method includes obtaining, by a computing system comprising one or more computing devices, power response data for a power detector of the wireless device, the power response data providing a relationship between power detector readings from the power detector and measured transmit power of a transmitter of the wireless device. The method includes identifying, by the computing system, a target power detector reading value corresponding to a target transmit power based at least in part on the power response data. The method includes initializing, by the computing system, a transmitter gain of the transmitter to an initial transmitter gain value. The method includes obtaining, by the computing system, a power detector reading value from the power detector. The method includes determining, by the computing system, that a difference between the power detector reading value and the target power detector reading value is greater than a tolerance margin. The method includes adjusting, by the computing system, a transmitter gain value of the transmitter in a direction of the difference between the power detector reading value and the target power detector reading value.

Another example aspect of the present disclosure is directed to a wearable device. The wearable device includes a transmitter comprising a power detector, one or more processors, and one or more nonvolatile memory devices storing computer-readable instructions, that, when implemented, cause the one or more processors to perform operations. The operations include obtaining power response data for the power detector, the power response data providing a relationship between power detector readings from the power detector and measured transmit power of the transmitter. The operations include identifying a target power detector reading value corresponding to a target transmit power based at least in part on the power response data. The operations include initializing a transmitter gain of the transmitter to an initial transmitter gain value. The operations include obtaining a power detector reading value from the power detector. The operations include determining, by the computing system, that a difference between the power detector reading value and the target power detector reading value is greater than a tolerance margin. The operations include adjusting a transmitter gain value of the transmitter in a direction of the difference between the power detector reading value and the target power detector reading value.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4 depicts an example power response lookup table according to example embodiments of the present disclosure.

Figure 1:
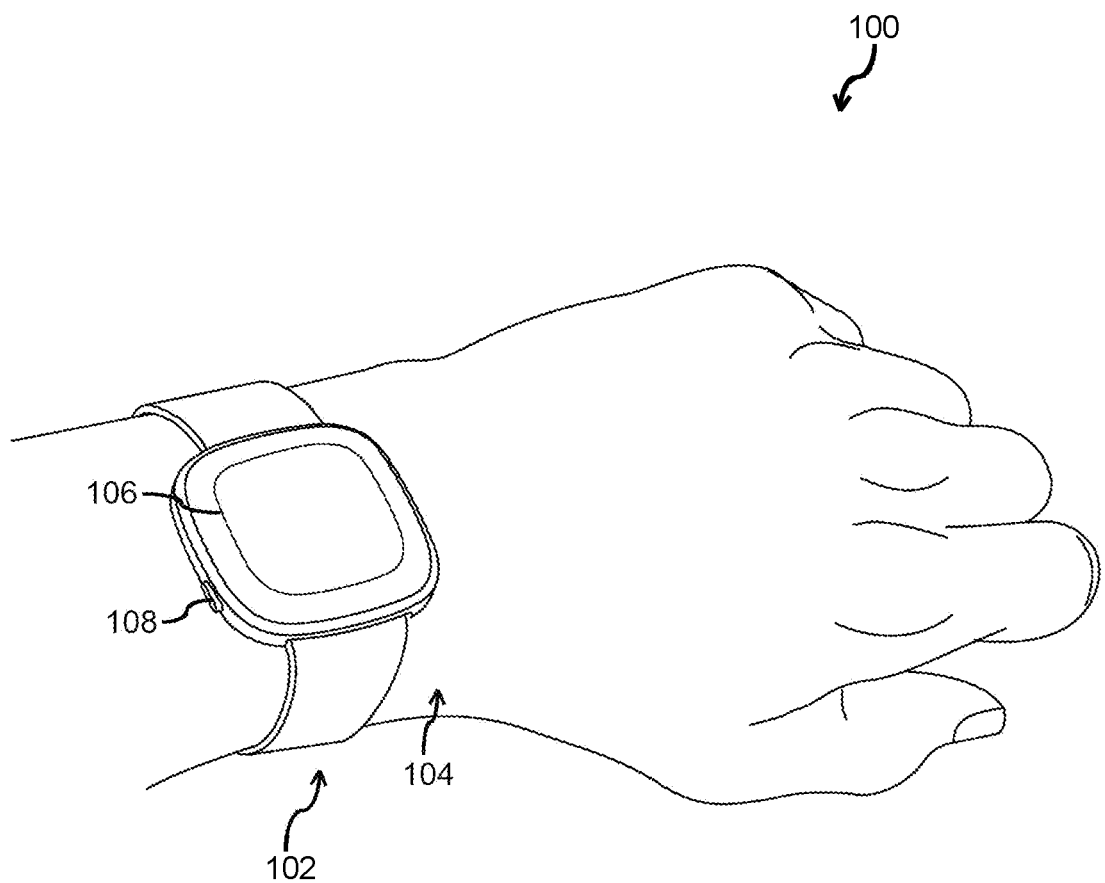
FIG. 1 depicts a diagram of an example wearable device according to example embodiments of the present disclosure.

Reference numerals that are repeated across plural figures are intended to identify the same features in various implementations.

DETAILED DESCRIPTION

Generally, the present disclosure is directed to automatic RF transmit power control for over the air testing of wearable devices. Manufacturing a wireless-enabled device, such as an LTE-enabled wearable device, can include calibrating the device's maximum transmit power (e.g., over all LTE bands) to a specified limit, such as a regulatory maximum (e.g., 23 dBm). For instance, among even devices manufactured according to the same specifications, device-to-device variations in manufacturing conditions, suppliers, component tolerances, and/or other factors can contribute to performance variations in, among other things, the maximum transmit power of the devices. Calibration can thus be required to ensure near-identical maximum transmit power among manufactured devices. For instance, having consistent and reliably-calibrated transmit power across manufactured devices can provide for improved performance of the devices, adherence of devices to regulatory guidelines, etc. The maximum transmit power can be calibrated during an over-the-air (OTA) testing stage of manufacturing. For instance, various characteristics (e.g., gain(s)) of the device can be adjusted and/or configured such that the device achieves the specified maximum transmit power. According to example aspects of the present disclosure, a device may be calibrated (e.g., during manufacturing) to learn calibration data that configures the device for a desired transmit power.

Some approaches for calibrating maximum transmit power employ a wireless communications testing device for LTE and/or similar communication technologies, referred to as a call box. For instance, the call box can be used to test the transmit power of the device directly. The call box can establish (e.g., simulate) a cellular call with the wireless device. For instance, one calibration approach, referred to as online mode, involves establishing a voice and/or data call with the device to be calibrated via a callbox. This approach can simulate a full communication protocol, such as LTE or WCDMA. In another approach, referred to as non-signaling factory test mode (non-signaling FTM), the device is assigned a band and channel, and its receiver (e.g., the callbox) receives an uplink single from the device. The device can transmit at its calibrated maximum transmit power to the receiver. This approach can be used for throughput testing.

However, call box equipment can be prohibitively expensive. For instance, it may not be economically feasible to provide a call box at some or all stations in manufacturing. In addition, the use of a callbox can increase an amount of time required to calibrate the device. For instance, the approaches described above can require establishing a call between the callbox and the device to be calibrated, which can be a time-consuming process. For example, the use of a callbox can require several seconds or longer of configuration steps at the callbox, which typically require manual user input, thereby slowing down manufacturing.

To provide for calibrating the maximum transmit power of a device without a callbox, the device may be placed into a factory test mode (FTM). For instance, the use of FTM may provide for a device to be tested without requiring a callbox, whereas other modes such as online mode or non-signaling FTM may require a callbox. The device configured in the factory test mode may provide for direct control over the device's transmitter and/or receiver while bypassing radiofrequency calibration data for the transmitter and/or receiver. For instance, in FTM, a device's transmit power may be indirectly controlled by adjusting an adjustable (e.g., variable) transmitter gain value, such as a Tx RGI value, or Tx AGC (automatic gain control), to an arbitrary value. For instance, the transmitter gain can be directly controlled, and transmit power can be measured (e.g., by a spectrum analyzer, power meter, etc.). While a device is configured in factory test mode, it may not be possible to configure the device to transmit at maximum transmit power by a direct setting (e.g., all-up bits). For instance, the correlation between transmitter gain and power level may be unknown or may not be easily determinable. Thus, in the case where it is desirable to configure the device to transmit at a given transmit power (e.g., 23 dBm), it may be difficult to configure the device as such while the device is in FTM.

Example aspects of the present disclosure provide for improved efficiency and/or accuracy in setting a wearable device's RF (e.g., LTE) transmit power during manufacturing over-the-air (OTA) testing. The wearable device can include a transmitter. The transmitter can be an LTE transmitter. The transmitter in the device has the capability to transmit at an adjustable RF transmit power via a transmit gain setting. For instance, the device can be configured in factory test mode, which can provide for direct control of transmit power via the transmit gain setting. However, the direct relationship between transmit power and transmit gain may be unknown. The transmitter can also include a power detector. The power detector can translate the RF transmit power, as seen at the transmitter (e.g., prior to an antenna of the transmitter), into a power detector reading. For instance, the power detector reading can be a value, such as a 16 bit value, that increases (e.g., monotonically) as the transmit gain increases. In the over-the-air testing, the device may be operating in factory test mode during the manufacturing process. The factory test mode may impose limitations on how the device's (e.g., LTE) transmitter can be controlled. In particular, during the factory test mode, without a wireless communications tester, the device cannot acquire a cellular signal and therefore is unable to set its own RF transmit power.

According to example aspects of the present disclosure, a wireless device (e.g., an LTE-enabled wearable device) having a RF transmitter undergoes RF calibration during the factory manufacturing process to generate power response data. During the RF calibration process, the RF transmitter's performance is characterized by the establishment of power response data. This characterization can result in the creation of "non-volatile" (NV) power response data that is stored to a memory of the device (e.g., a flash memory). In some implementations, this power response data includes a lookup table that characterizes the transmit power of the LTE transmitter versus its power detector reading. One intended purpose of this lookup table is limiting the LTE transmitter's maximum RF transmit power to a pre-determined value in order to meet regulatory requirements. For instance, the transmit gain setting may be adjusted (e.g., reduced) if the measured power detector value corresponds in the lookup table to a transmit power that is greater than the maximum RF transmit power. The lookup table may thus provide a relationship correlating the power detector reading (e.g., which may be measured by the device from its power detector) to actual transmit power from the transmitter, providing for the power detector to (e.g., indirectly) measure the transmit power.

For instance, in some implementations, the lookup table can include at least a first column descriptive of transmit power and a second column descriptive of power detector readings. The first column may be chosen by a chipset manufacturer. As such, the values in the first column may not exactly align with a target transmit power. The values in the second column can be recorded by sweeping over some or all values of the transmitter gain, measuring the power detector value and/or transmit power at each transmitter gain value, and recording in the table the power detector value that is measured when the transmit power in the first column is measured. This table can be used such that the device limits its transmit power. For instance, when the device is a participant in a phone call with a cellular base station, the base station can instruct the device to transmit with more or less power based on distance, direction of movement relative to base station, etc. The station may be limited in that the station can only instruct the device to increase or decrease power, without additional specificity. At some point, it is necessary to limit the transmit power, such as due to physical characteristics of the device, the transmitter, regulatory requirements, etc.

However, according to example aspects of the present disclosure, this lookup table can additionally be used for the purpose of setting the RF transmit power during the manufacturing process, in addition to and/or alternatively to RF transmit power limiting. In particular, an OTA manufacturing test may be a subsequent processing step to the RF calibration. For instance, at a point in time during which the OTA manufacturing test is performed, the lookup table may exist in a memory of the device and/or another computing system used in manufacturing. During the OTA manufacturing test, the device's RF transmitter can be enabled at a predetermined RF transmit power level, such as a fixed value. Example aspects of the present disclosure can provide for automatically setting the RF transmit power to a desired value, such as a value that complies with regulatory and/or carrier requirements. Example aspects of the present disclosure can employ the lookup table to identify and/or extrapolate the power detector value that results in the device transmitting at a certain RF transmit power level. This power detector value is used as a target power detector value. For instance, the device's transmit gain can be adjusted (e.g., increased) until its power detector value equals the target power detector value, and/or is within some pre-determined tolerance margin of the target power detector value. When the target is reached, the desired transmit power is also met.

Example aspects of the present disclosure can provide for a computer-implemented method for setting RF transmit power of a wireless device. For instance, the RF transmit power can be set during over-the-air testing of the wireless device, in which the device is configured in a factory test mode. In some implementations, the wireless device can be a wearable device, such as a smartwatch. The wireless device can include a transmitter. The transmitter can be any suitable type of transmitter, such as an LTE transmitter, a WCDMA transmitter, etc. The transmitter can include a power detector circuit coupled to a transmit path of the transmitter. For instance, the transmit path can provide a signal to be transmitted to an antenna of the transmitter for wireless transmission. In some implementations, the power detector comprises an analog-to-digital converter (e.g., a 16-bit ADC) coupled to the transmit path of the transmitter.

The method can include obtaining (e.g., by a computing system including one or more computing devices) power response data for a power detector of the wireless device. The power response data can provide a relationship between power detector readings from the power detector and measured transmit power of a transmitter of the wireless device. For instance, the power response data can be or can include a power response lookup table correlating reference transmit power values to reference power detector reading values. As an example, in some implementations, the power response lookup table includes a first column listing the reference transmit power values (e.g., which may be defined by a manufacturer of the transmitter, device, etc.) and a second column listing the reference power detector reading values. The power response data is established during an RF calibration stage. For instance, the power response data can be obtained and/or calibrated by reading the input to the power detector during a transmitter sweep calibration (e.g., a linear sweep). As one example, during the RF calibration stage, the power response lookup table can be built to index measured and/or estimated transmit power values versus power detector reading values (e.g., via a scaled gain). The power response lookup table can be established with respect to reference conditions, such as a reference temperature (e.g., of the wireless device) and/or a reference frequency (e.g., for which the transmitter is configured, such as a frequency channel). The readings can be interpolated and/or extrapolated as necessary to record accurate values for a given transmit power in the power response data. For instance, the power response data may include transmit power entries that are predefined, and may not directly correspond to the sweep calibration.

In some implementations, the power response lookup table can include a number of entries (e.g., 16 entries) corresponding to a portion of a dynamic range of the transmitter (e.g., an upper quarter of the dynamic range of the transmitter). For instance, in some implementations, the power response lookup table items contain the response of the power detector for the upper ¼th of the transmitter's dynamic range (e.g., from 6.8 dBm to 30.8 dBm). The upper quarter of the transmitter's dynamic range can be broken into a number of items, such as 16 items or segments. The transmit power can be varied such that the power detector reading varies over the segments. The power detector reading can be measured and/or stored in the power response lookup table. In some implementations, values for higher transmit powers can be extrapolated from the measured power detector readings. For instance, in one example implementation, the dynamic range of the transmitter is 102.4 dB, the maximum power is 32.4 dBm, and the top quarter of the transmitter's dynamic range is 6.8 dBm to 32.4 dBm. In this implementation, if the target transmit power is 23.0 dBm, the target power detector values falls between the 10th and 11th indices of the power response lookup table.

The method can include identifying (e.g., by the computing system) a target power detector reading value corresponding to a target transmit power based at least in part on the power response data. For instance, the target transmit power may be established based on regulatory or other requirements. It may be desirable to set the device at the target transmit power for the purposes of over-the-air testing. As one example, in some implementations, the target transmit power can be 23 dBm. The device can be placed into a factory test mode such that the transmitter gain of the device can be controlled. However, the direct relationship between transmitter gain and transmitter power may be unknown. The transmitter gain can be any suitable gain, such as a transmitter automatic gain control (Tx AGC) or Tx RGI.

In some implementations, identifying the target power detector reading value can include accessing (e.g., by the computing system) the power response data to determine a target power detector reading associated with the target transmit power in a first channel. For instance, the target power detector reading associated with the target transmit power may be stored or indexed in the power response data. Additionally and/or alternatively, the target transmit power may fall between two indices in the power response data. In this case, the target power detector reading may be interpolated from the power response data (e.g., by fitting a mathematical relationship to the power response data).

In some implementations, the RF band for which the device is configured to communicate may be divided into one or more channels, such as a low channel, a middle channel, and/or a high channel. In some cases, the characterization used to generate the power response data is performed at one channel (e.g., the mid channel) of the band of interest. However, the power detector's response is also characterized at the other channels, such as at the low and high channels, at a fixed power level. This characterization of the power detector with respect to frequency may also be stored in the device's memory. This characterization can be used when setting the RF transmit power for a channel other than the channel for which the power response data is characterized. For instance, the frequency characterization can be used in determining a channel correction factor. When the target power detector value is generated for a channel other than the channel for which the device is calibrated, a correction can be made to the target power detector value. This correction is determined using the characterization of the power detector over frequency information. When this correction is applied, the target can be made different in comparison to the reference calibration frequency (e.g., the mid channel of the band of interest).

For instance, in some implementations, identifying the target power detector reading value can include obtaining (e.g., by the computing system) a channel correction factor based at least in part on a characterization of power detector reading with respect to frequency. For instance, the characterization can detail how the power detector reading varies with frequency. Additionally and/or alternatively, identifying the target power detector reading value can include applying (e.g., by the computing system) the channel correction factor to the target power detector reading to correct the target power detector reading to a second channel. The second channel can be different from the first channel. For instance, in some implementations, a band over which the transmitter is configured to communicate can include a low channel, a middle channel, and a high channel. The first channel can be a reference frequency and the second channel can be one of the low channel, the middle channel, or the high channel.

Additionally and/or alternatively, the method can include initializing (e.g., by the computing system) a transmitter gain of the transmitter to an initial transmitter gain value. The initial transmitter gain value can be any suitable value, such as, for example, an arbitrary value. In some implementations, for example, the transmitter gain value can be an approximation (e.g., a manual approximation) of the expected final gain value that will result in the device being set to the target transmit power. As an example, if the expected final gain value is expected to be about 50, the initial transmitter gain value may be set to 50. As another example, in some implementations, the initial transmitter gain value may be zero. As another example, in some implementations, the initial transmitter gain value is an average gain value established based at least in part on over-the-air testing of a plurality of other wireless devices. The value may be any suitable average gain value, such as, for example, a mean value, a median value, a mode value, an approximation, or any other suitable average. For instance, the initial transmitter gain may be learned from testing of prior (e.g., similar and/or identical devices).

Additionally and/or alternatively, the method can include obtaining (e.g., by the computing system) a power detector reading value from the power detector. For instance, the power detector can be configured to output a value indicative of a signal at a transmit path of the transmitter (e.g., by an ADC). The wireless device and/or another computing system can read the value from the power detector. Additionally, the method can include determining (e.g., by the computing system) that a difference between the power detector reading value and the target power detector reading value is greater than a tolerance margin. For instance, the tolerance margin can provide that the device can get close to the target power level in the case of discrete gain levels with finite precision. In response to determining that the difference is greater than a tolerance margin, the method can include adjusting (e.g., by the computing system) a transmitter gain value of the transmitter in a direction of the difference between the power detector reading value and the target power detector reading value. For instance, in some implementations, adjusting the transmitter gain value can include one of incrementally increasing or incrementally decreasing the transmitter gain value. Additionally, the method can include determining (e.g., by the computing system) that the difference between the power detector reading value and the target power detector reading value is less than the tolerance margin. In response to determining that the difference is less than the tolerance margin, the method can include configuring the wireless device for wireless communications based on the transmitter gain value. For instance, once the difference is less than the tolerance margin, the device can be tested by over-the-air testing.

For instance, in some implementations, once the transmitter gain is initialized to the initial transmitter gain value, an initial power detector reading value can be read from the power detector. If the initial power detector reading value is less than the target, then the transmitter gain value can be increased (e.g., by a discrete amount, such as 1). A new power detector reading value can be read after the transmitter gain value is increased. This can be repeated over one or more iterations until the power detector reading value is within a tolerance margin of the target. Additionally and/or alternatively, if the initial power detector reading value is greater than the target, then the transmitter gain value can be decreased (e.g., by a discrete amount, such as 1). A new power detector reading value can be read after the transmitter gain value is decreased. This can be repeated over one or more iterations until the power detector reading value is within a tolerance margin of the target.

Example aspects of the present disclosure can provide for a number of technical effects and benefits. For instance, setting the transmitter gain of an RF transmitter based on power response data can improve manufacturing efficiency of wireless devices, such as wearable devices, thereby conserving computational resources such as processor usage, memory usage, network bandwidth, etc. As one example, systems and methods according to example aspects of the present disclosure can provide for a device to be tested without requiring expensive hardware such as callboxes. Additionally and/or alternatively, systems and methods according to example aspects of the present disclosure can provide for reduced time and/or increased speed of configuring a device for a given transmit power, again conserving computational resources such as processor usage, memory usage, network bandwidth, etc.

With reference now to the Figures, example embodiments of the present disclosure will be discussed in further detail.

FIG. 1 illustrates a view 100 of an example electronic device 102 being worn on the arm 104 of a user. Electronic devices, such as wearable electronic devices, can interact with a user through a touch-sensitive display 106, one or more mechanical buttons 108, or other such input mechanisms known for such purposes. Such devices can also be configured to communicate wirelessly with another computing device, such as a smartphone owned by the user wearing the electronic device. While a device such as a smartwatch or fitness tracker is shown, it should be understood that various other types of electronic devices can benefit from advantages of the various embodiments as discussed and suggested herein, and as would be apparent to one or ordinary skill in the art in light of the present disclosure. The electronic device 102 can include a battery (not illustrated) configured to provide power for various components of the electronic device 102.

Figure 2:
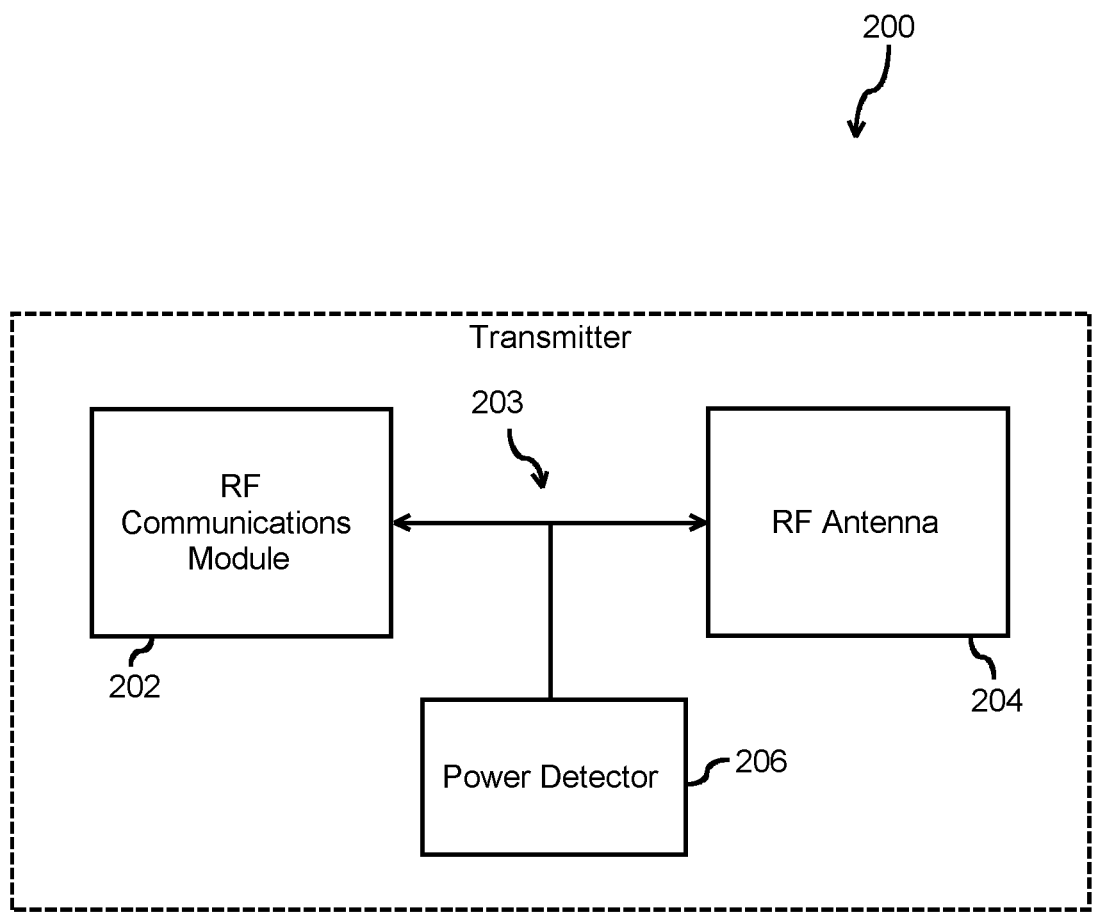
FIG. 2 depicts a block diagram of an example transmitter according to example embodiments of the present disclosure.

FIG. 2 depicts a block diagram of an example transmitter 200 according to example embodiments of the present disclosure. For instance, the transmitter 200 can be included in a wearable device, such as the wearable device of FIG. 1. The transmitter 200 can include an RF communications module 202. The RF communications module 202 can be configured to send and/or receive a signal via transmit path 203 to RF antenna 204, to establish wireless communications via RF antenna 204. The RF communications module can include components used in wireless communications, such as, for example, RF front-end module(s), one or more processor(s), signal conditioning module(s), or other suitable components. Power detector 206 can be disposed along transmit path 203. The power detector 206 can read power values (e.g., voltage values, current values, etc.) of a signal along transmit path 203 to determine a power detector reading value. The power detector reading value can be indicative of transmit power from the RF antenna 204. For instance, the relationship between the power detector reading value at power detector 206 and transmit power can be provided by power response data (e.g., as illustrated by power response lookup table 400 of FIG. 4).

Figure 3:
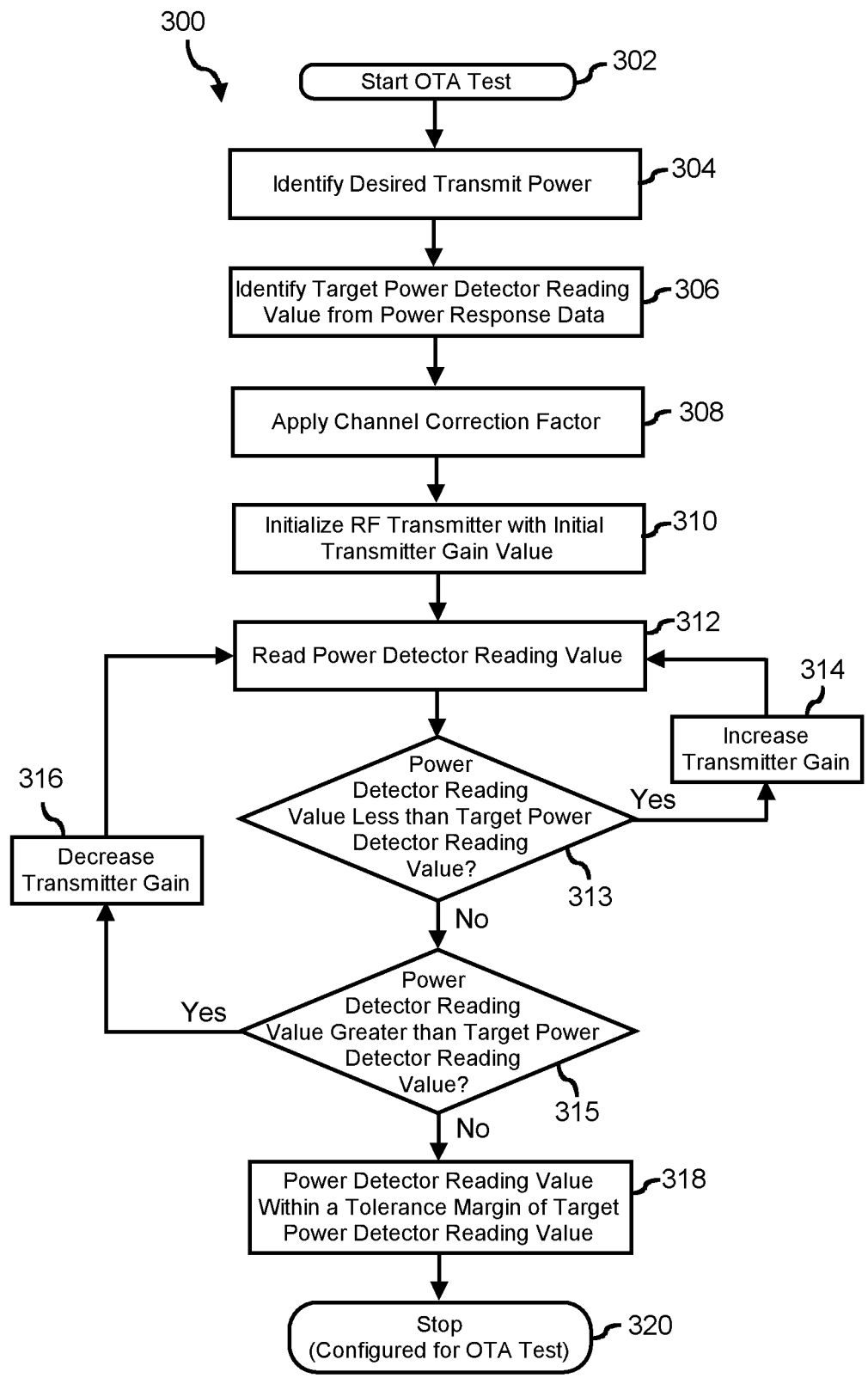
FIG. 3 depicts a flowchart diagram of an example process for setting transmit power according to example embodiments of the present disclosure.

FIG. 3 depicts a flowchart diagram 300 of an example process for setting transmit power according to example embodiments of the present disclosure. At 302, the OTA test can be started. For instance, it can be desired to test wireless communications (e.g., LTE) capabilities of the device. At 304, a desired transmit power can be identified. For instance, the desired transmit power can be user-specified and/or selected based on regulatory requirements, device characteristics, etc.

At 306, a target power detector reading value corresponding to a target transmit power can be identified based at least in part on the power response data. For instance, the target transmit power may be established based on regulatory or other requirements. It may be desirable to set the device at the target transmit power for the purposes of over-the-air testing. As one example, in some implementations, the target transmit power can be 23 dBm. The device can be placed into a factory test mode such that the transmitter gain of the device can be controlled. However, the direct relationship between transmitter gain and transmitter power may be unknown. The transmitter gain can be any suitable gain, such as a transmitter automatic gain control (Tx AGC) or Tx RGI.

In some implementations, identifying the target power detector reading value can include accessing (e.g., by the computing system) the power response data to determine a target power detector reading associated with the target transmit power in a first channel. For instance, the target power detector reading associated with the target transmit power may be stored or indexed in the power response data. Additionally and/or alternatively, the target transmit power may fall between two indices in the power response data. In this case, the target power detector reading may be interpolated from the power response data (e.g., by fitting a mathematical relationship to the power response data).

The power response data can provide a relationship between power detector readings from the power detector and measured transmit power of a transmitter of the wireless device. For instance, the power response data can be or can include a power response lookup table correlating reference transmit power values to reference power detector reading values. As an example, in some implementations, the power response lookup table includes a first column listing the reference transmit power values (e.g., which may be defined by a manufacturer of the transmitter, device, etc.) and a second column listing the reference power detector reading values. The power response data is established during an RF calibration stage. For instance, the power response data can be obtained and/or calibrated by reading the input to the power detector during a transmitter sweep calibration (e.g., a linear sweep). As one example, during the RF calibration stage, the power response lookup table can be built to index measured and/or estimated transmit power values versus power detector reading values (e.g., via a scaled gain). The power response lookup table can be established with respect to reference conditions, such as a reference temperature (e.g., of the wireless device) and/or a reference frequency (e.g., for which the transmitter is configured, such as a frequency channel). The readings can be interpolated and/or extrapolated as necessary to record accurate values for a given transmit power in the power response data. For instance, the power response data may include transmit power entries that are predefined, and may not directly correspond to the sweep calibration.

In some implementations, the RF band for which the device is configured to communicate may be divided into one or more channels, such as a low channel, a middle channel, and/or a high channel. In some cases, the characterization used to generate the power response data is performed at one channel (e.g., the mid channel) of the band of interest. However, the power detector's response is also characterized at the other channels, such as at the low and high channels, at a fixed power level. This characterization of the power detector with respect to frequency may also be stored in the device's memory. This characterization can be used when setting the RF transmit power for a channel other than the channel for which the power response data is characterized. For instance, the frequency characterization can be used in determining a channel correction factor. When the target power detector value is generated for a channel other than the channel for which the device is calibrated, a correction can be made to the target power detector value. This correction is determined using the characterization of the power detector over frequency information. When this correction is applied, the target can be made different in comparison to the reference calibration frequency (e.g., the mid channel of the band of interest).

For instance, at 308, a channel correction factor can be applied based at least in part on a characterization of power detector reading with respect to frequency. For instance, the characterization can detail how the power detector reading varies with frequency. Additionally and/or alternatively, identifying the target power detector reading value can include applying (e.g., by the computing system) the channel correction factor to the target power detector reading to correct the target power detector reading to a second channel. The second channel can be different from the first channel. For instance, in some implementations, a band over which the transmitter is configured to communicate can include a low channel, a middle channel, and a high channel. The first channel can be a reference frequency and the second channel can be one of the low channel, the middle channel, or the high channel.

At 310, a transmitter can be initialized such that a transmitter gain of the transmitter is initialized to an initial transmitter gain value. The initial transmitter gain value can be any suitable value, such as, for example, an arbitrary value. In some implementations, for example, the transmitter gain value can be an approximation (e.g., a manual approximation) of the expected final gain value that will result in the device being set to the target transmit power. As an example, if the expected final gain value is expected to be about 50, the initial transmitter gain value may be set to 50. As another example, in some implementations, the initial transmitter gain value may be zero. As another example, in some implementations, the initial transmitter gain value is an average gain value established based at least in part on over-the-air testing of a plurality of other wireless devices. The value may be any suitable average gain value, such as, for example, a mean value, a median value, a mode value, an approximation, or any other suitable average. For instance, the initial transmitter gain may be learned from testing of prior (e.g., similar and/or identical devices).

At 312, a power detector reading value can be read from the power detector. For instance, the power detector can be configured to output a value indicative of a signal at a transmit path of the transmitter (e.g., by an ADC). The wireless device and/or another computing system can read the value from the power detector. At 313, it can be determined if the power detector reading value is less than the target power detector reading value. If the power detector reading value is less than the target, the transmitter gain can be increased, at 314. The power detector reading value can again be read at 312. These steps 312 through 314 can be repeated, if necessary, until the power detector reading value is not less than the target power detector reading value.

At 315, it can be determined if the power detector reading value is greater than the target power detector reading value. If the power detector reading value is greater than the target, the transmitter gain can be decreased, at 316. The power detector reading value can again be read at 310, and the method can again return to 315 through 313. These steps 315 through 316 can be repeated, if necessary, until the power detector reading value is not greater than the target power detector reading value. When the process has progressed to step 318, the power detector reading value will be equivalent to the target power detector reading value and/or within at least a tolerance margin of the target. At this point, the process can be stopped at 320. For instance, when the process is stopped at 320, the device has successfully been configured for the target transmit power, and the OTA test can be performed and/or continued.

FIG. 4 depicts an example power response lookup table 400 according to example embodiments of the present disclosure. In the example implementation of FIG. 4, the power response lookup table 400 includes a first column 410 listing the reference transmit power values. The reference transmit power values may be defined by a manufacturer of the transmitter, device, etc., such that the values in the first column 410 are immutable. The power response table 400 additionally includes a second column 420 listing the reference power detector reading values. The values in the second column 420 can be established during an RF calibration stage. For instance, the power response data can be obtained and/or calibrated by reading the input to the power detector during a transmitter sweep calibration (e.g., a linear sweep). As one example, during the RF calibration stage, the power response lookup table 400 can be built to index measured and/or estimated transmit power values versus power detector reading values (e.g., via a scaled gain). The power response lookup table 400 can be established with respect to reference conditions, such as a reference temperature (e.g., of the wireless device) and/or a reference frequency (e.g., for which the transmitter is configured, such as a frequency channel). The readings can be interpolated and/or extrapolated as necessary to record accurate values for a given transmit power in the first column 410. For instance, the first column 410 may include transmit power entries that are predefined, and may not directly correspond to the sweep calibration.

In the example implementation of FIG. 4, the power response lookup table 400 includes 16 entries corresponding to a portion of a dynamic range of the transmitter (e.g., an upper quarter of the dynamic range of the transmitter). For instance, in some implementations, the power response lookup table 400 contains the response of the power detector for the upper ¼th of the transmitter's dynamic range (e.g., from 6.8 dBm to 30.8 dBm). The upper quarter of the transmitter's dynamic range can be broken into a number of items, such as 16 items or segments. The transmit power can be varied such that the power detector reading varies over the segments. The power detector reading can be measured and/or stored in the second column 420 of the power response lookup table 400. In some implementations, values for higher transmit powers can be extrapolated from the measured power detector readings. For instance, in one example implementation, the dynamic range of the transmitter is 102.4 dB, the maximum power is 32.4 dBm, and the top quarter of the transmitter's dynamic range is 6.8 dBm to 32.4 dBm. In this implementation, if the target transmit power is 23.0 dBm, the target power detector values falls between the $10^{th}$ and $11^{th}$ indices of the power response lookup table. Thus, to determine the target power detector value for 23.0 dBm, the value can be extrapolated from the values in the $10^{th}$ and $11^{th}$ indices. For instance, in the illustrated implementation of FIG. 4, the target power detector reading value for 23.0 dBm will fall between the power detector reading value in the $10^{th}$ index, 2799, and the value in the $11^{th}$ index, 3408. These values can be extrapolated by any linear relationship, such as a linear relationship, curve-fitting relationship, etc.

Figure 5:
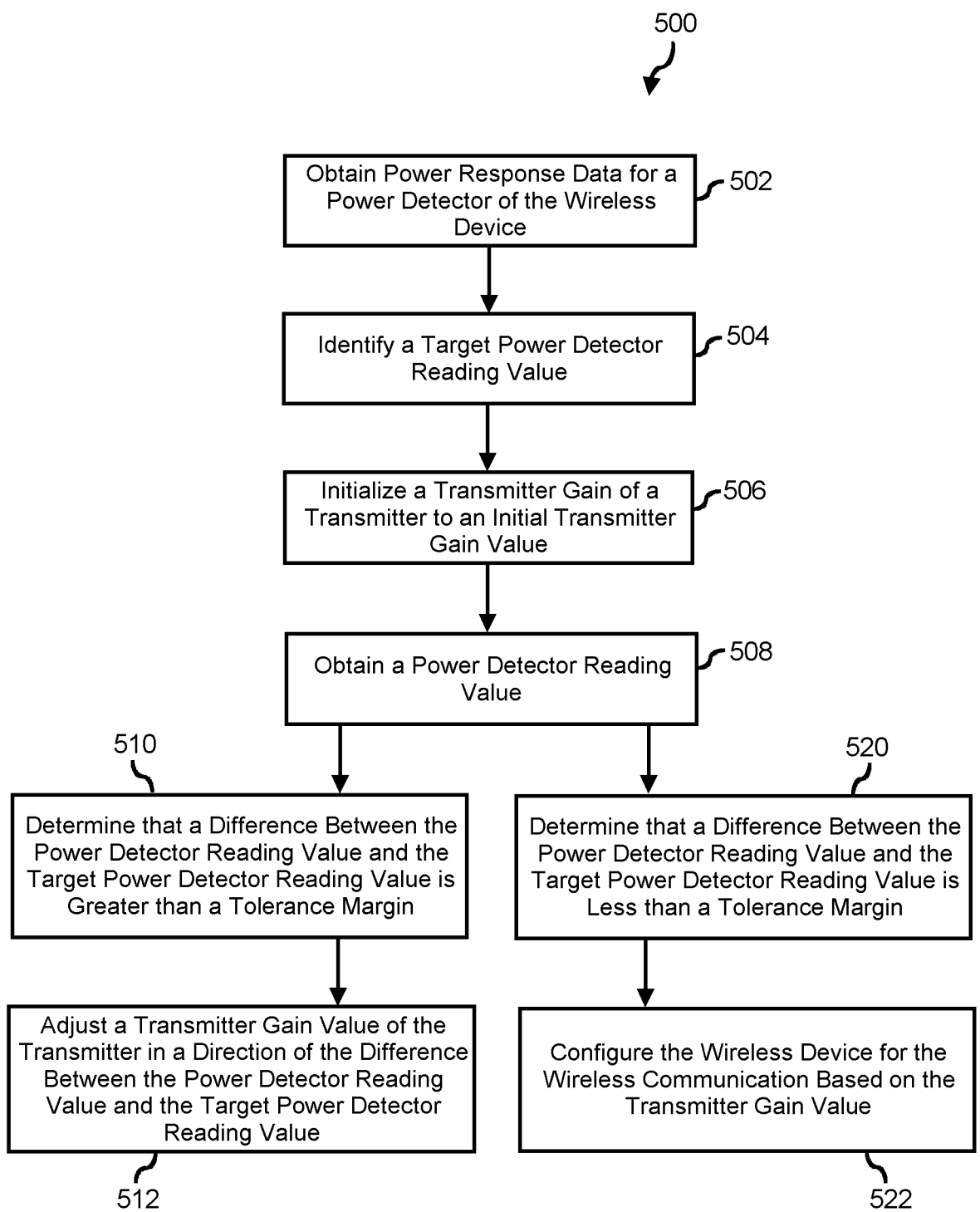
FIG. 5 depicts a flowchart diagram of an example method for setting transmit power according to example embodiments of the present disclosure.

FIG. 5 depicts a flow chart diagram of an example method to perform setting RF transmit power of a wireless device according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

The method 500 can include, at 502, obtaining (e.g., by a computing system including one or more computing devices) power response data for a power detector of the wireless device. The power response data can provide a relationship between power detector readings from the power detector and measured transmit power of a transmitter of the wireless device. For instance, the power response data can be or can include a power response lookup table correlating reference transmit power values to reference power detector reading values. As an example, in some implementations, the power response lookup table includes a first column listing the reference transmit power values (e.g., which may be defined by a manufacturer of the transmitter, device, etc.) and a second column listing the reference power detector reading values. The power response data is established during an RF calibration stage. For instance, the power response data can be obtained and/or calibrated by reading the input to the power detector during a transmitter sweep calibration (e.g., a linear sweep). As one example, during the RF calibration stage, the power response lookup table can be built to index measured and/or estimated transmit power values versus power detector reading values (e.g., via a scaled gain). The power response lookup table can be established with respect to reference conditions, such as a reference temperature (e.g., of the wireless device) and/or a reference frequency (e.g., for which the transmitter is configured, such as a frequency channel). The readings can be interpolated and/or extrapolated as necessary to record accurate values for a given transmit power in the power response data. For instance, the power response data may include transmit power entries that are predefined, and may not directly correspond to the sweep calibration.

In some implementations, the power response lookup table can include a number of entries (e.g., 16 entries) corresponding to a portion of a dynamic range of the transmitter (e.g., an upper quarter of the dynamic range of the transmitter). For instance, in some implementations, the power response lookup table items contain the response of the power detector for the upper ¼th of the transmitter's dynamic range (e.g., from 6.8 dBm to 30.8 dBm). The upper quarter of the transmitter's dynamic range can be broken into a number of items, such as 16 items or segments. The transmit power can be varied such that the power detector reading varies over the segments. The power detector reading can be measured and/or stored in the power response lookup table. In some implementations, values for higher transmit powers can be extrapolated from the measured power detector readings. For instance, in one example implementation, the dynamic range of the transmitter is 102.4 dB, the maximum power is 32.4 dBm, and the top quarter of the transmitter's dynamic range is 6.8 dBm to 32.4 dBm. In this implementation, if the target transmit power is 23.0 dBm, the target power detector values falls between the 10th and 11th indices of the power response lookup table.

The method 500 can include, at 504, identifying (e.g., by the computing system) a target power detector reading value corresponding to a target transmit power based at least in part on the power response data. For instance, the target transmit power may be established based on regulatory or other requirements. It may be desirable to set the device at the target transmit power for the purposes of over-the-air testing. As one example, in some implementations, the target transmit power can be 23 dBm. The device can be placed into a factory test mode such that the transmitter gain of the device can be controlled. However, the direct relationship between transmitter gain and transmitter power may be unknown. The transmitter gain can be any suitable gain, such as a transmitter automatic gain control (Tx AGC) or Tx RGI.

In some implementations, identifying the target power detector reading value can include accessing (e.g., by the computing system) the power response data to determine a target power detector reading associated with the target transmit power in a first channel. For instance, the target power detector reading associated with the target transmit power may be stored or indexed in the power response data. Additionally and/or alternatively, the target transmit power may fall between two indices in the power response data. In this case, the target power detector reading may be interpolated from the power response data (e.g., by fitting a mathematical relationship to the power response data).

In some implementations, the RF band for which the device is configured to communicate may be divided into one or more channels, such as a low channel, a middle channel, and/or a high channel. In some cases, the characterization used to generate the power response data is performed at one channel (e.g., the mid channel) of the band of interest. However, the power detector's response is also characterized at the other channels, such as at the low and high channels, at a fixed power level. This characterization of the power detector with respect to frequency may also be stored in the device's memory. This characterization can be used when setting the RF transmit power for a channel other than the channel for which the power response data is characterized. For instance, the frequency characterization can be used in determining a channel correction factor. When the target power detector value is generated for a channel other than the channel for which the device is calibrated, a correction can be made to the target power detector value. This correction is determined using the characterization of the power detector over frequency information. When this correction is applied, the target can be made different in comparison to the reference calibration frequency (e.g., the mid channel of the band of interest).

For instance, in some implementations, identifying the target power detector reading value can include obtaining (e.g., by the computing system) a channel correction factor based at least in part on a characterization of power detector reading with respect to frequency. For instance, the characterization can detail how the power detector reading varies with frequency. Additionally and/or alternatively, identifying the target power detector reading value can include applying (e.g., by the computing system) the channel correction factor to the target power detector reading to correct the target power detector reading to a second channel. The second channel can be different from the first channel. For instance, in some implementations, a band over which the transmitter is configured to communicate can include a low channel, a middle channel, and a high channel. The first channel can be a reference frequency and the second channel can be one of the low channel, the middle channel, or the high channel.

Additionally and/or alternatively, the method 500 can include, at 506, initializing (e.g., by the computing system) a transmitter gain of the transmitter to an initial transmitter gain value. The initial transmitter gain value can be any suitable value, such as, for example, an arbitrary value. In some implementations, for example, the transmitter gain value can be an approximation (e.g., a manual approximation) of the expected final gain value that will result in the device being set to the target transmit power. As an example, if the expected final gain value is expected to be about 50, the initial transmitter gain value may be set to 50. As another example, in some implementations, the initial transmitter gain value may be zero. As another example, in some implementations, the initial transmitter gain value is an average gain value established based at least in part on over-the-air testing of a plurality of other wireless devices. The value may be any suitable average gain value, such as, for example, a mean value, a median value, a mode value, an approximation, or any other suitable average. For instance, the initial transmitter gain may be learned from testing of prior (e.g., similar and/or identical devices).

Additionally and/or alternatively, the method 500 can include, at 508, obtaining (e.g., by the computing system) a power detector reading value from the power detector. For instance, the power detector can be configured to output a value indicative of a signal at a transmit path of the transmitter (e.g., by an ADC). The wireless device and/or another computing system can read the value from the power detector. Additionally, The method 500 can include, at 510, determining (e.g., by the computing system) that a difference between the power detector reading value and the target power detector reading value is greater than a tolerance margin. For instance, the tolerance margin can provide that the device can get close to the target power level in the case of discrete gain levels with finite precision. In response to determining that the difference is greater than a tolerance margin, The method 500 can include, at 512, adjusting (e.g., by the computing system) a transmitter gain value of the transmitter in a direction of the difference between the power detector reading value and the target power detector reading value. For instance, in some implementations, adjusting the transmitter gain value can include one of incrementally increasing or incrementally decreasing the transmitter gain value. Additionally, The method 500 can include, at 520, determining (e.g., by the computing system) that the difference between the power detector reading value and the target power detector reading value is less than the tolerance margin. In response to determining that the difference is less than the tolerance margin, The method 500 can include, at 522, configuring the wireless device for wireless communications based on the transmitter gain value. For instance, once the difference is less than the tolerance margin, the device can be tested by over-the-air testing.

For instance, in some implementations, once the transmitter gain is initialized to the initial transmitter gain value, an initial power detector reading value can be read from the power detector. If the initial power detector reading value is less than the target, then the transmitter gain value can be increased (e.g., by a discrete amount, such as 1). A new power detector reading value can be read after the transmitter gain value is increased. This can be repeated over one or more iterations until the power detector reading value is within a tolerance margin of the target. Additionally and/or alternatively, if the initial power detector reading value is greater than the target, then the transmitter gain value can be decreased (e.g., by a discrete amount, such as 1). A new power detector reading value can be read after the transmitter gain value is decreased. This can be repeated over one or more iterations until the power detector reading value is within a tolerance margin of the target.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for setting RF transmit power of a wireless device, the computer-implemented method comprising:
    obtaining, by a computing system comprising one or more computing devices, power response data for a power detector of the wireless device, the power response data providing a relationship between power detector readings from the power detector and measured transmit power of a transmitter of the wireless device;
    identifying, by the computing system, a target power detector reading value corresponding to a target transmit power based at least in part on the power response data by:
        accessing, by the computing system, the power response data to determine a target power detector reading associated with the target transmit power in a first channel;
        obtaining, by the computing system, a channel correction factor based at least in part on a characterization of power detector reading with respect to frequency; and
        applying, by the computing system, the channel correction factor to the target power detector reading to correct the target power detector reading to a second channel, the second channel being different from the first channel;
    initializing, by the computing system, a transmitter gain of the transmitter to an initial transmitter gain value;
    obtaining, by the computing system, a power detector reading value from the power detector;
    determining, by the computing system, that a difference between the power detector reading value and the target power detector reading value is greater than a tolerance margin; and
    adjusting, by the computing system, a transmitter gain value of the transmitter in a direction of the difference between the power detector reading value and the target power detector reading value.

2. The computer-implemented method of claim 1, the method further comprising:
    determining, by the computing system, that the difference between the power detector reading value and the target power detector reading value is less than the tolerance margin; and
    configuring the wireless device for wireless communications based on the transmitter gain value.

3. The computer-implemented method of claim 1, the power response data comprising a power response lookup table, the power response lookup table correlating reference transmit power values to reference power detector reading values.

4. The computer-implemented method of claim 3, the power response lookup table comprising a first column comprising the reference transmit power values and a second column comprising the reference power detector reading values.

5. The computer-implemented method of claim 3, the power response lookup table comprising 16 entries corresponding to an upper quarter of a dynamic range of the transmitter.

6. The computer-implemented method of claim 1, the power detector comprising an analog-to-digital converter coupled to a transmit path of the transmitter.

7. The computer-implemented method of claim 1, a band over which the transmitter being configured to communicate comprises a low channel, a middle channel, and a high channel, the first channel comprising a reference frequency, and the second channel comprising one of the low channel, the middle channel, or the high channel.

8. The computer-implemented method of claim 1, adjusting the transmitter gain value comprising one of incrementally increasing or incrementally decreasing the transmitter gain value.

9. The computer-implemented method of claim 1, the power response data being established during an RF calibration stage.

10. The computer-implemented method of claim 1, the device being placed into a factory test mode such that the transmitter gain of the device can be controlled.

11. The computer-implemented method of claim 1, the initial transmitter gain value being an average gain value established based at least in part on over-the-air testing of a plurality of other wireless devices.

12. The computer-implemented method of claim 1, the wireless device comprising a wearable device.

13. The computer-implemented method of claim 1, the transmitter comprising an LTE transmitter.

14. The computer-implemented method of claim 1, the transmitter gain value comprising a transmitter automatic gain control (Tx AGC) value.

15. A wearable device, comprising:
a transmitter comprising a power detector;
one or more processors; and
one or more nonvolatile memory devices storing computer-readable instructions, that, when implemented, cause the one or more processors to perform operations, the operations comprising:
obtaining power response data for the power detector, the power response data providing a relationship between power detector readings from the power detector and measured transmit power of the transmitter;
identifying a target power detector reading value corresponding to a target transmit power based at least in part on the power response data by:
accessing the power response data to determine a target power detector reading associated with the target transmit power in a first channel;
obtaining a channel correction factor based at least in part on a characterization of power detector reading with respect to frequency; and
applying the channel correction factor to the target power detector reading to correct the target power detector reading to a second channel, the second channel being different from the first channel;
initializing a transmitter gain of the transmitter to an initial transmitter gain value;
obtaining a power detector reading value from the power detector;
determining, by the computing system, that a difference between the power detector reading value and the target power detector reading value is greater than a tolerance margin; and
adjusting a transmitter gain value of the transmitter in a direction of the difference between the power detector reading value and the target power detector reading value.

16. The wearable device of claim 15, the operations further comprising:
determining that the difference between the power detector reading value and the target power detector reading value is less than the tolerance margin; and
configuring the wireless device for wireless communications based on the transmitter gain value.

17. The wearable device of claim 15, the power response data comprising a power response lookup table, the power response lookup table correlating reference transmit power values to reference power detector reading values.

18. The wearable device of claim 15, the power response data being established during an RF calibration stage.

* * * * *